US008051484B2

(12) United States Patent
Shulman et al.

(10) Patent No.: US 8,051,484 B2
(45) Date of Patent: Nov. 1, 2011

(54) METHOD AND SECURITY SYSTEM FOR INDENTIFYING AND BLOCKING WEB ATTACKS BY ENFORCING READ-ONLY PARAMETERS

(75) Inventors: Amichai Shulman, Givataim (IL); Gur Shatz, Rehovot (IL); Ido Yellin, Kfar Saba (IL)

(73) Assignee: Imperva, Inc., Redwood Shores, CA (US)

( * ) Notice: Subject to any disclaimer, the term of this patent is extended or adjusted under 35 U.S.C. 154(b) by 898 days.

(21) Appl. No.: 11/423,364

(22) Filed: Jun. 9, 2006

(65) Prior Publication Data

US 2006/0272008 A1 Nov. 30, 2006

Related U.S. Application Data

(60) Provisional application No. 60/690,134, filed on Jun. 14, 2005.

(51) Int. Cl.
*G06F 21/00* (2006.01)

(52) U.S. Cl. .............................. 726/24; 726/22; 726/25

(58) Field of Classification Search .............. 726/22–25
See application file for complete search history.

(56) References Cited

U.S. PATENT DOCUMENTS

| 5,347,578 | A | | 9/1994 | Duxbury |
|---|---|---|---|---|
| 5,623,601 | A | | 4/1997 | Vu |
| 5,908,469 | A | | 6/1999 | Botz et al. |
| 5,941,957 | A | * | 8/1999 | Ingrassia et al. .............. 709/248 |
| 5,951,643 | A | * | 9/1999 | Shelton et al. ................ 709/227 |
| 6,311,278 | B1 | | 10/2001 | Raanan et al. |
| 6,578,147 | B1 | * | 6/2003 | Shanklin et al. ................ 726/22 |
| 6,584,569 | B2 | | 6/2003 | Reshef et al. |
| 6,804,704 | B1 | | 10/2004 | Bates et al. |
| 7,185,092 | B2 | * | 2/2007 | Furui et al. ..................... 709/225 |
| 7,222,306 | B2 | * | 5/2007 | Kaasila et al. ................ 715/801 |
| 7,313,823 | B2 | * | 12/2007 | Gao ................................. 726/26 |
| 7,640,235 | B2 | | 12/2009 | Shulman et al. |
| 7,743,420 | B2 | | 6/2010 | Shulman et al. |
| 7,752,662 | B2 | | 7/2010 | Shulman et al. |
| 2002/0116643 | A1 | * | 8/2002 | Raanan et al. ................ 713/201 |
| 2004/0103021 | A1 | | 5/2004 | Scarfe et al. |
| 2005/0044420 | A1 | | 2/2005 | Raanan et al. |
| 2005/0071642 | A1 | | 3/2005 | Moghe et al. |
| 2007/0124806 | A1 | | 5/2007 | Shulman et al. |
| 2007/0214503 | A1 | | 9/2007 | Shulman et al. |
| 2007/0294539 | A1 | | 12/2007 | Shulman et al. |
| 2008/0065640 | A1 | | 3/2008 | Shulman et al. |
| 2008/0320567 | A1 | | 12/2008 | Shulman et al. |
| 2010/0251377 | A1 | | 9/2010 | Shulman et al. |

OTHER PUBLICATIONS

Freeware IT Security Test Tools, Application Defense Center, 2005, 1 page, downloaded from http://web.archive.org/web/20050204104234/www.imperva.com/appl ication_defense_cent... on Jan. 20, 2011, Imperva, Inc.

(Continued)

*Primary Examiner* — Nasser Moazzami
*Assistant Examiner* — Ghazal Shehni
(74) *Attorney, Agent, or Firm* — Blakely Sokoloff Taylor & Zafman, LLP

(57) ABSTRACT

A method for detecting and blocking web attacks, the method comprising identifying read-only parameters by parsing responses received from uniform resource locators. The combinations of binding correlation values (BCVs) of the read-only parameters are compared to their respective previously observed values.

23 Claims, 4 Drawing Sheets

OTHER PUBLICATIONS

Imperva Delivers First True Gigabit Application Firewall Solution, Gartner IT Security Summit, Jun. 6, 2005, 3 pages, Washington, DC, Imperva, Inc., downloaded from http://web.archive.org/web/20060312094936/www.imperva.com/company/news/2005-jun-... on Jan. 20, 2011.

Imperva Delivers Unique Security Insight into Applications in Production, New Release of SecureSphere Extends the Reach of Innovative Dynamic Profiling Technology, Dec. 13, 2004, 3 pages, Foster City, California, Imperva, Inc. downloaded from http://web.archive.org/web/20050207165342/www.imperva.com/company/news/2004-dec... on Jan. 20, 2011.

Imperva SecureSphere Data Security Solutions, 2006, 1 page, downloaded from http://web.archive.org/web/20060312093140/www.imperva.com/products/securesphere/ on Jan. 20, 2011, Imperva Inc.

Imperva SecureSphere Dynamic Profiling Firewall, 2005, 2 pages, downloaded from http://web.archive.org/web/20050207181514/www.imperva.com/products/securesphere/ on Jan. 20, 2011, Imperva, Inc.

Imperva SecureSphere, Securing the Enterprise Application Sphere, Apr. 1, 2004, 2 pages, vol. 2.0, Imperva, Inc.

Imperva SecureSphere Technical Description, 2004, 20 pages, Imperva, Inc.

Imperva Unveils Next Generation Firewall Technology: Dynamic Profiling, SecureSphere 3.0 Delivers Total Application Security from Web, Worm and Database Threats, 2004, 2 pages, downloaded from http://web.archive.org/web/20041015225044/www.imperva.com/company/news/2004-aug-23.html on Dec. 21, 2010, Imperva, Inc.

Imperva SecureSphere Demo, Ready to take a test drive?, 2005, 2 pages, downloaded from http://web.archive.org/web/20050204212849/www.imperva.com/securesphere/de... on Jan. 20, 2011, Imperva, Inc.

SecureSphere Dynamic Profiling Firewall, Total Application Security, 2004, 2 pages, Imperva, Inc.

SecureSphere Dynamic Profiling Firewall, Total Application Security, 2004, 4 pages, Imperva, Inc.

SecureSphere Management & Reporting, Sep. 26, 2004, 1 page, V.3.0, downloaded from http://web.archive.org/web/20041023204255/www.imperva.com/products/securesphere/management_reporting.html on Nov. 23, 2010, Imperva, Inc.

SecureSphere Web and Database Firewalls, 2004, 2 pages, downloaded from http://web.archive.org/web/20041224083525/www.imperva.com/products/securesphere/w... on Jan. 20, 2011, Imperva, Inc.

SecureSphere Web Application Firewall, The Industry's Only Automated Web Application Firewall, 2006, 4 pages, Imperva, Inc.

SecureSphere web application security white papers, 2005, 2 pages, downloaded from http://web.archive.org/web/20050204213342/www.imperva.com/products/securesphere/w... on Jan. 20, 2011, Imperva, Inc.

Total Application Security with the SecureSphere Dynamic Profiling Firewall, A Practical Approach to Defending the Application Data Center, 2004, 10 pages, Imperva, Inc.

Traditional Web Application Security vs. SecureSphere, A Comparison of Hard Trigger Rules vs. Correlated Attack Validation, 2004, 10 pages, Imperva, Inc.

\* cited by examiner

METHOD AND SECURITY SYSTEM FOR INDENTIFYING AND BLOCKING WEB ATTACKS BY ENFORCING READ-ONLY PARAMETERS

CROSS REFERENCE TO RELATED APPLICATIONS

This application claims priority from U.S. provisional application No. 60/690,134 filed on Jun. 14, 2005, the contents of which are incorporated herein by reference.

REFERENCES

The following documents provide useful background information, for which, they are incorporated herein by reference.

| Patents | | |
| --- | --- | --- |
| 6,804,704 | October 2004 | Bates, et al. |
| 6,584,569 | June 2003 | Reshef, et al. |
| 6,311,278 | October 2001 | Raanan, et al. |
| 5,908,469 | June 1999 | Botz, et al. |
| 5,623,601 | April 1997 | Vu |
| 5,347,578 | September 1994 | Duxbury |

| Published Applications | | |
| --- | --- | --- |
| 20020116643 | August 2002 | Raanan, et al. |
| 20050044420 | February 2005 | Raanan, et al. |

TECHNICAL FIELD

The disclosed teachings relate generally to application level security systems, and more particularly to techniques for non-intrusive security system for identifying and parameter tampering.

BACKGROUND

The accessibility, ubiquity and convenience of the Internet is rapidly changing the way people access information. The World Wide Web ("WWW"), usually referred to as "the web", is the most popular means for retrieving information on the Internet. The web enables user access to a practically infinite number of resources. These comprise the likes of interlinked hypertext documents accessed by a hypertext transfer protocol (HTTP), and extensible markup language (XML) protocols from servers located around the world. Organizations expose their business information and functionality on the web through software applications, usually referred to as "web applications" or "enterprise applications". The web applications use the Internet technologies and infrastructures. A typical web application is structured as a three-layer system, comprising of a presentation layer, a business logic layer, and a data access layer. The multiple layers of the enterprise application are interconnected by application protocols, such as HTTP and structured query language (SQL).

Web applications provide great opportunities for enterprises or organizations. However, at the same time these applications are vulnerable to attack from malicious, irresponsible or criminally minded individuals, also known as web hackers, or organizations. For this reason, enterprises use security systems to protect their web applications from a plurality of types of attacks.

One solution utilized to secure web applications of a web server is the use of firewalls. They provide a sufficient protection against low-level protocols used for attacks, such as transmission control protocol (TCP) or user datagram protocol (UDP). However, the firewalls cannot protect against application level protocols, such as HTTP or any other proprietary protocols. Security solutions designed to protect web applications from attacks committed through application level protocols are known as application level security systems.

Application level security systems are designed to detect illegal requests sent to an application. Amongst other violations, these systems try to identify requests submitted by clients that tamper what should otherwise be read-only parameters. Read-only parameters are comprised in a web page and comprise fixed fields, hidden fields, menu options, and so on. For example, a client is not entitled to change the price of a product offered for sale on a web site, and therefore the price field should be designated as a read-only parameter.

One security solution for detecting unauthorized commands is discussed in U.S. Pat. No. 6,311,278 (hereinafter the '278 patent) by Raanan, et al. The '278 patent discloses a method and system for automatically and continually extracting application protocol data for defining a set of allowable (or authorized) actions. The method involves intercepting each protocol message in its entirety before it is sent or in parallel with sending to a client (by a server). The message is in response to a specific request from the client. The method then translates the message into internal format parses the message to identify user-selectable options contained in the message, and translates the massage back to be sent on the network. The user-selectable options may be commands (e.g., a submit command in an HTML form), fields, and so on. These items represent the set of allowable or authorized user actions for a particular session. The set of allowable user actions is stored in a protocol database accessible to a gateway or filter module. Once the gateway or filter module receives a client request, it compares data, commands or other actions in the request with the corresponding entities now stored in the protocol database. If no such disallowed actions are in the request, the request is transmitted to the server; otherwise, the entire request is denied.

The security solution described in the '278 patent is inefficient for blocking web attacks by enforcing read-only parameters. One of many reasons is the high number of false positives of detection error produced by the system. As mentioned above, the system detects web attacks by profiling allowed and disallowed actions. However, some actions (or commands) are not considered as read-only parameters, and thus a client can modify them. In such case, the system would generate an alarm even if the client's action is legal. Another reason for the system's inefficiency is the poor performance which results from processing each any every response, even though the response does not comprise a read-only parameter, and the latency induced by translating each response and request to and from the internal representation. Furthermore, the security solution of the '278 changes the formant of intercepted messages, and thus, such a solution cannot manifest itself as a non-intrusive security solution.

SUMMARY

It would be, therefore, advantageous to provide a non-intrusive security system that efficiently detects and blocks web attacks by enforcing read-only parameters.

The disclosed teachings provide a method for detecting and blocking web attacks, the method comprising identifying read-only parameters by parsing responses received from uniform resource locators. The combinations of binding correlation values (BCVs) of the read-only parameters are compared to their respective previously observed values.

Specifically, the read-only parameter is at least one of: a hidden field in a form, a link with a query string, a checkbox, a radio button, a combo box.

More specifically, the read-only parameter is identified by a process including generating a list of bound parameters and generating a list of binding URLs.

Even more specifically, the bound parameter is a read-only parameter having an explicit value given by an HTML element in a previous response.

Even more specifically, the binding URL is a URL whose response contains an HTML element that sets the value of a bound parameter.

Even more specifically, generating the list of bound parameters further comprises processing an incoming response. At least one read-only parameter is detected in the processed response. A value of the read-only parameter is extracted. Using the extracted value, a BCV of the read-only parameter is computed. The read-only parameter is classified.

Even more specifically, the method comprises creating a session dictionary entry. The read-only parameter is saved in said session dictionary entry. A URL that yielded the processed response in the session dictionary entry is saved. The BCV is saved in the session dictionary entry.

Even more specifically, the classifying of the read-only parameter further comprises marking said read-only parameter if following conditions are satisfied: the read-only parameter is found in a request sent from a client; and the read-only parameter's BCV matches a corresponding BCV in the dictionary entry.

Even more specifically, the read-only parameter is added to the list of bound parameters if the number of marked observations for the read-only parameter is above a predefined threshold.

Even more specifically, generating the list of binding URLs further comprises grouping all URLs that yielded the bound parameters in the list of bound parameters.

In another specific enhancement, comparing combinations of BCVs further comprises parsing a request submitted by a client computer. The values and names of the read-only parameters in the request are computed. For each read-only parameter in said responses the following is performed: checking if said read-only parameter exists in the session dictionary, computing a BCV of said read-only parameter using the extracted values; and matching the computed BCV of the read-only parameter to its BCV in said session dictionary.

More specifically, the method further comprises denying the request if the BCVs of at least one read-only parameter are not matched.

Another aspect of the disclosed teachings is a computer program product including a computer readable medium having instructions. The instructions enable a computer to perform the techniques described above.

Yet another aspect of the disclosed teachings is a non-intrusive network security system that is operable to implement a procedure for enforcing read-only parameters to detect and block web attacks, the security system comprising at least one secure sensor operable to process responses for identifying read-only parameters and binding uniform resource locators (URLs). A secure server generates lists of the read-only parameters and said binding URLs. The secure server blocks web attacks by comparing combinations of binding correlation values (BCVs) of identified read-only parameters to their respective previously observed values. A plurality of connections are provided to assist the plurality of secure sensors to monitor traffic directed to at least one device that requires protection.

BRIEF DESCRIPTION OF THE DRAWINGS

The disclosed teachings will become more apparent by describing in detail examples and embodiments thereof with reference to the attached drawings in which.

DETAILED DESCRIPTION

The disclosed teachings overcome the above disadvantages and other disadvantages not described above by providing techniques designed to profile read-only parameters of binding uniform resource locators (URLs). This allows minimizing the amount of false positives detection errors in a web application protection system. According to the disclosed teachings, only responses from binding URLs are parsed to extract the parameters' values and names. This allows improving performance due to reduced number of responses that should be parsed. Attacks are blocked by comparing combinations of binding correlation values (BCVs) of the identified parameters to their respective previously observed values.

Figure 1:
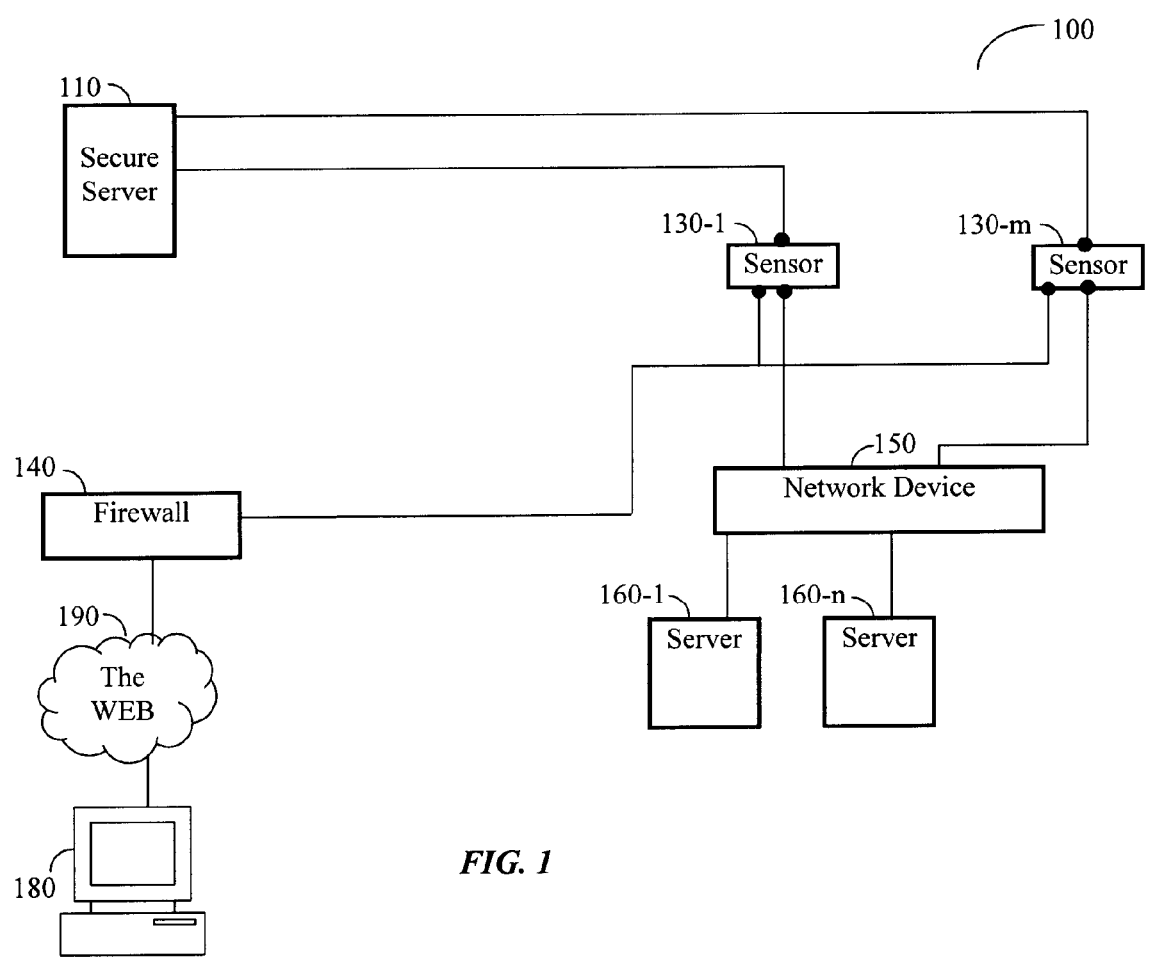
FIG. 1 is an exemplary diagram of a security system disclosed in accordance with an exemplary embodiment of the disclosed teachings.

Referring to FIG. 1, there is shown an exemplary diagram of an application level security system 100 according to one embodiment of the disclosed teachings. Security system 100 is capable of detecting and blocking web attacks by identifying read-only parameters and enforcing their usage. Security system 100 handles various types of read-only parameters including, but not limited to, hidden fields in a form, a link with a query string, checkboxes, radio buttons, combo boxes, or any other input fields. The disclosed teachings handle read-only parameters by using a model of "bound parameters" and "binding URLs". A bound parameter is a parameter whose value is explicitly given by an HTML element in some previous response. Particularly, the value of hidden fields in HTML forms is expected to be bounded. A binding URL is a URL whose response contains an HTML element that sets the value of a bound parameter.

The security system 100 comprises a plurality of secure sensors 130 connected to a secure server 110. Secure sensors 130-1, 130-m may be connected to secure server 110 through out-of-band network (not shown) for transferring traffic over a dedicated and secure network that is completely separated from the production traffic. A secure sensor 130 is placed on each network segment that comprises servers 160-1, 160-n (e.g., Web or database servers) to be protected. The security system 100 is a non-intrusive system, and thus each of secure sensors 130-1, 130-m is configured to operate in the line of traffic, i.e., traffic passing directly through the secure sensor 130-1 to protected server 160-1.

The security system 100 operates in one of two modes: a learning mode or a protection mode. In the learning mode, the security system 100 identifies and creates lists of binding URLs and bound parameters. The process for creating these lists is divided between the secure server 110 and secure sensors 130-1, 130-m. Specifically, the secure sensors 130-1, 130-m perform the actual processing of responses and perform preliminary correlations of parameter values to previously processed responses. The secure server 110 keeps score of the results for each parameter and makes a final decision regarding which parameters can actually be used for enforcing. The process of identifying and creating lists of binding URLs and bound parameters is described in greater detail below. In the protection mode, the security system 100 enforces combinations of read-only parameters. Specifically, the enforcement process parses requests, submitted by client 180, for the purpose of extracting values of bound parameters in each request. Then, a binding correlation value (BCV) is computed over the extracted values from each request. The BCV is then compared to BCVs computed based on values detected in previous responses. If a match exists, the request is authorized; otherwise, the request is denied. The enforcement process is described in detail below.

The security system 110 operates in the line of traffic between client 180 and protected server 160, i.e., as opposed to a proxy system. When operating in line of traffic, parts of a malicious request may already have been relayed to server 160. However, the network connection between server 160 and client 180 is guaranteed to be terminated before server 160 obtains and evaluates the complete request.

The security system 100 comprises session dictionaries, which are data structures utilized for maintaining information about read-only parameters. A session dictionary is created in each new established session and it contains data to be used both in the learning and protection modes. Specifically, each entry in a session dictionary holds data that relates to a single parameter, including a target URL, a parameter name and one or more binding URLs and one or more BCVs. BCVs are always added to a parameter entry. If a specific BCV already appears in the entry for a particular parameter, only the last source from which the parameter was obtained is saved. The BCVs in the dictionaries are mapped to both binding and target URLs. For example, the mapping is performed using two hash maps, a first map is used to map binding URLs to a list of BCVs extracted from each binding URL and the second map is used to map targets (i.e., the URL part of a bound parameter) to a list of BCVs that apply to that target. The use of hash tables significantly reduces processing time and thus improves the performance of the security system 100.

The security system 100 allows three different modes of aggregation and storing of BCVs in the session dictionaries: 1) always aggregate; 2) never aggregate; and 3) different sources aggregation. In the "always aggregate" mode, the security system 100 saves any combination of BCVs observed during a session. Saved BCVs are never deleted from the dictionary. In the "never aggregate" mode, the security system 100 saves only BCVs for a target URL that appeared in the last parsed response. In the third mode, the security system 100 accepts only BCVs for a binding URL that were identified in the last parsed response. The aggregation mode of security system 100 is configurable.

Figure 2:
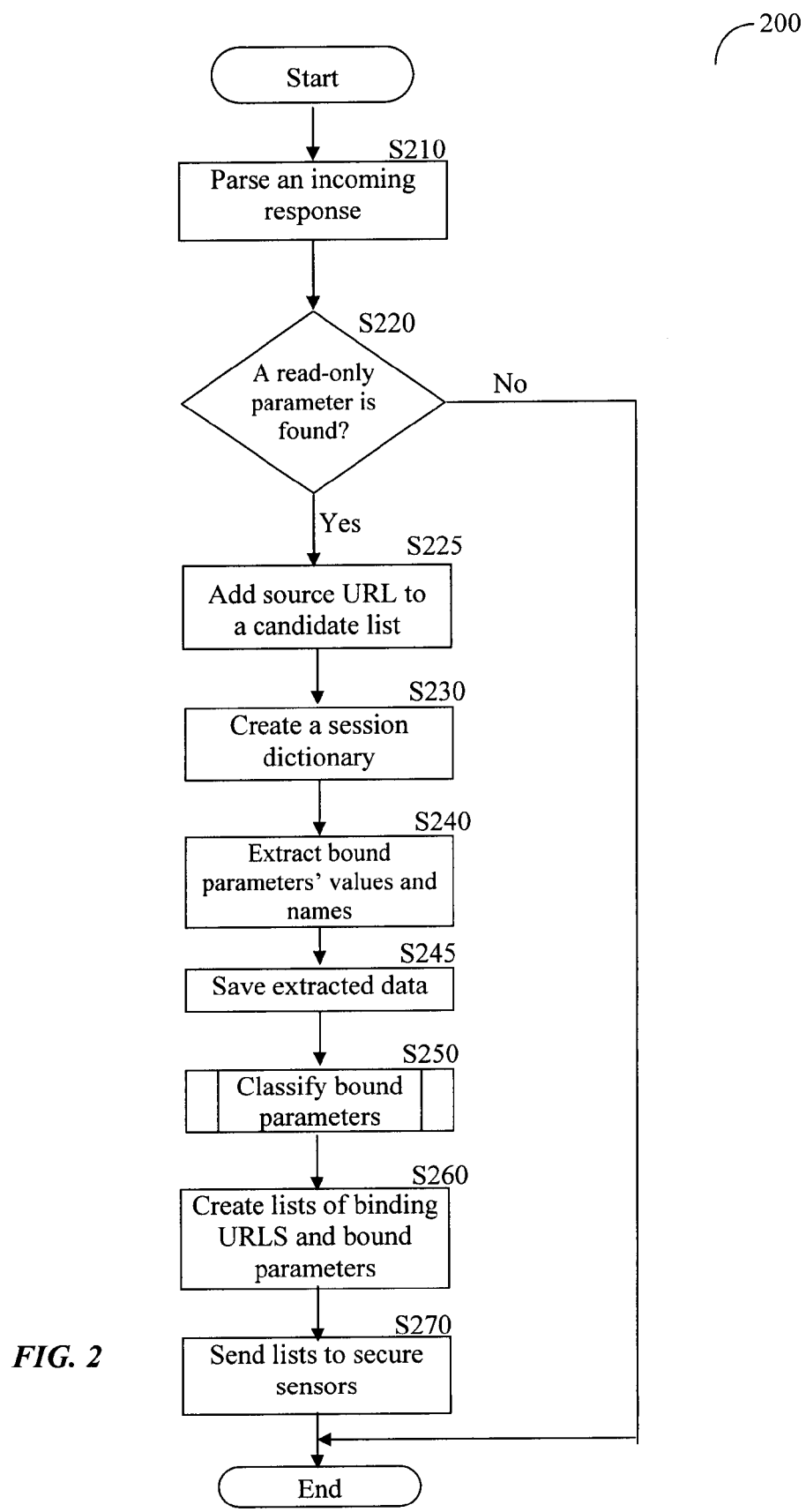
FIG. 2 is a flowchart describing the learning process in accordance with an exemplary embodiment of the disclosed teachings.

Referring to FIG. 2, a non-limiting and exemplary flowchart 200 describing the learning process in accordance with one embodiment of the disclosed teachings is shown. The aim of the learning process is to create a list of bound parameters and a list of binding URLs. At S210, an incoming response is parsed by a secure sensor 130 in order to detect potential read-only parameters. Responses can be statistically parsed, i.e., the sensor processes a response received after, for example, a configurable number of responses or an $i^{th}$ response received in a configurable amount of time. The secure sensors 130-1, 130-m parse responses only if a session is established and regardless to their source URL. That is, the source URL may be a binding, non-binding, or potential binding URL. At S220, it is checked if at least one potential read-only parameter is found in the parsed response, and if so execution continues with S225 where the URL that yielded the response is added to a list of candidate binding URLs (hereinafter "the candidate list"); otherwise, execution terminates.

At S230, a session dictionary is created for each new established session. At S240, potentially bound parameters and their values are extracted from responses of all URLs in the candidate list. Whenever a response from a candidate URL is encountered, the response is parsed if the URL was added to the list before the start time of the session. At S245, for each bound parameter an entry in the session dictionary is created and the parameter's related data is saved in that entry. In an exemplary embodiment, an entry is composed from the target URL, the parameter name, the BCV and the source URL, where the entry key is the target URL. For example, if an HTML form with a single hidden input field is identified in the response, then the URL from the "action" attribute is extracted and saved as the entry's key. Next, value of the hidden field is extracted, its BCV is computed and added to the entry along with the name of the hidden field and the URL that generated the response. It should be noted that an entry in the dictionary for a single parameter may contain a plurality of BCVs. At S250, the bound parameters are classified by the secure sensors 130-1, 130-m.

Figure 3:
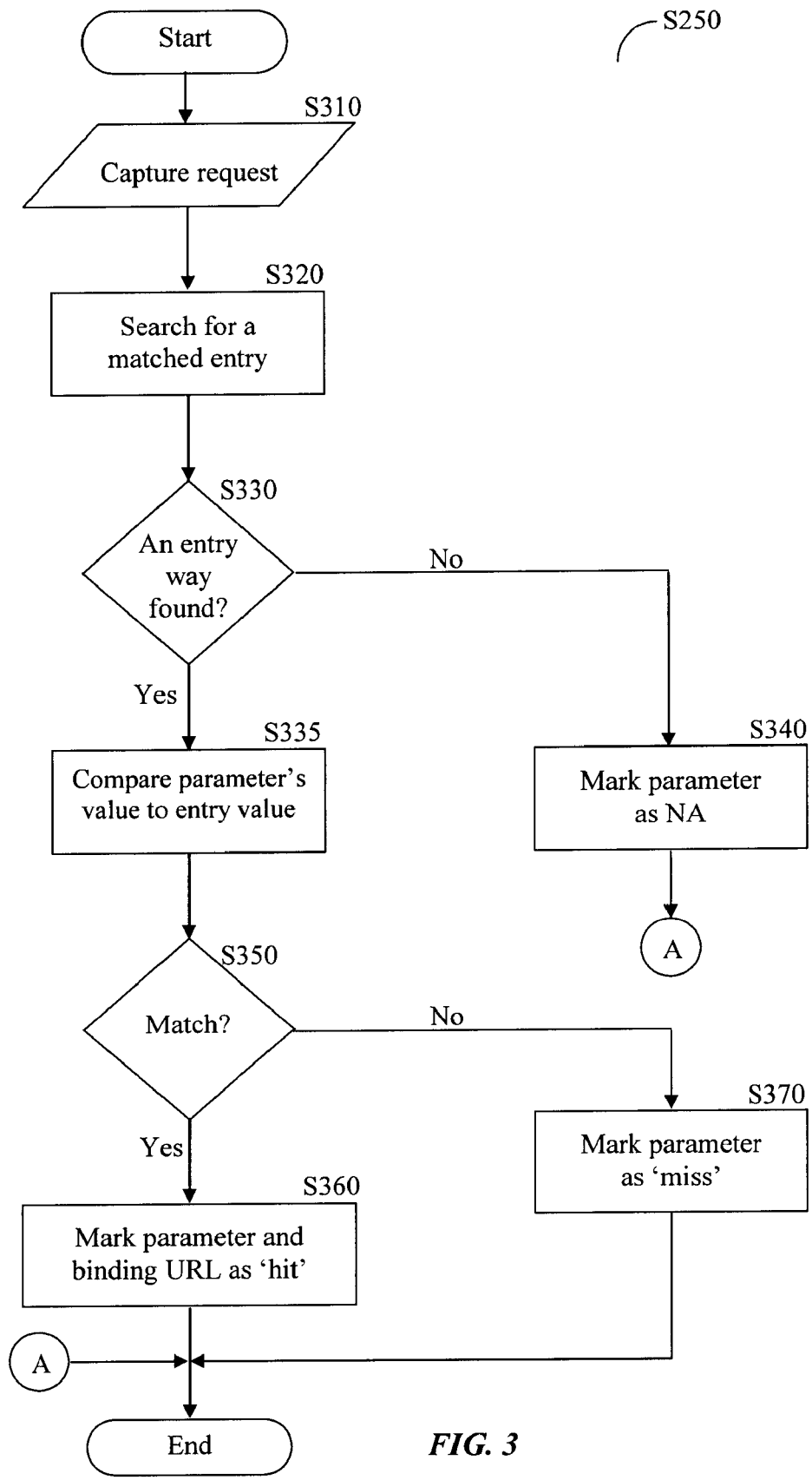
FIG. 3 is a flowchart describing the procedure for classifying read-only parameters in accordance with an exemplary embodiment of the disclosed teachings.

Referring now to FIG. 3, the execution of S250 is shown in detail. At S310, a request sent from a client (e.g., client 180) is captured by a secure sensor 130. At S320, for each bound parameter in the request, the secure sensor 130 searches in the session dictionaries for a matched entry. At S330, it is checked if such an entry was found, and if so, at S335, the value of the parameter is compared to a value in the entry. Otherwise, at S340, the parameter is marked as non-available (NA). At S350, it is determined if the BCV computed over the parameter's value matches any of the BCVs stored in the entry. If it matches, then at S360, the parameter and its binding URLs are marked as 'hit'. Otherwise, at S370, the parameter is marked as 'miss'. It should be noted that requests without an identified session are also marked as NA.

Referring back to FIG. 2, at S260, the lists of bound parameters and binding URLs are created. For this purpose, the secure server 110 keeps a count of the total number of observations for a parameter that are classified as 'hit'. The secure server 110 further keeps binding URLs for each such parameter (one parameter may be bounded by more than one URL). A bound parameter is added to the list if the number of observations for this parameter that classified as "hit" is overwhelmingly large with respect to other observations of the parameter. In an exemplary embodiment of the disclosed teachings, a parameter is considered as "read-only" if all its observations during a predefined period of time (e.g., 24 hours) are classified as "hit". The list of binding URLs is computed as the union of all binding URLs that correspond to the selected bound parameters. At S270, the lists of binding URLs and the bound parameters are sent to secure sensors 130-1, 130-m.

Figure 4:
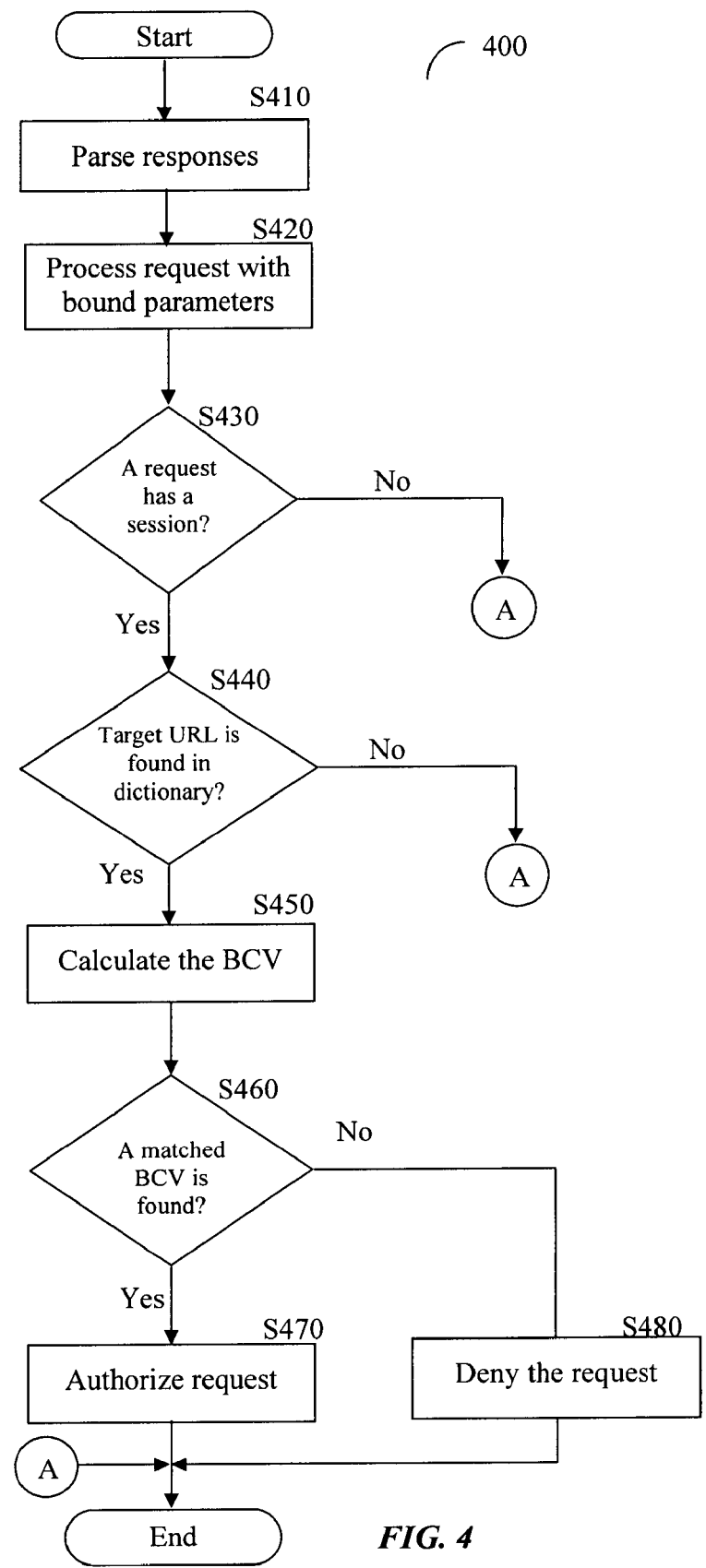
FIG. 4 is a flowchart describing the process for enforcing read-only parameters in accordance with an exemplary embodiment of the disclosed teachings.

Referring to FIG. 4, a non-limiting and exemplary flowchart 400 describing the process for enforcing read-only parameters in accordance with an exemplary embodiment of the disclosed teachings is shown. At S410, responses are parsed to determine the BCVs. Only responses generated in reply to binding URLs are parsed. Alternatively or collectively, all responses may be parsed. Specifically, all bound parameters within each form or link of each response are evaluated to determine a BCV. The BCV is computed as a combination of names and values of all bound parameters within the form. In an exemplary embodiment, a BCV value is computed as the cyclical redundancy checking (CRC) of the names and values put in alphabetical order with a random prefix. The computed BCVs are saved in the session dictionaries as described in greater detail above.

At S420, a request that comprises at least one bound parameter is processed. At S430, it is checked if the request belongs to a valid session, and further, if the session has a session dictionary. If these two conditions are satisfied, execution continues at S440; otherwise, execution terminates. At S440, it is checked if the target URL of the bound parameter in the request is found in the session's dictionary. If found, execution proceeds to S450 where the BCV of the request is calculated over all bound parameters in the request; otherwise, execution terminates. At S460, it is checked if the computed BCV is found in the session dictionary by looking at a list of BCVs available for the target URL. If a matching BCV is found, then, at S470, the request is authorized and execution ends. That is, no further processing is required if a BCV is identified. If a matching BCV is not found, then, at S480, the request is denied. In accordance with an exemplary embodiment of the disclosed teachings, the enforcement process generates an anomaly event before denying a request.

A significant aspect of the disclosed teachings is a computer program product including a computer readable medium having instructions. The instructions enable a computer to perform the techniques described above. The computer readable medium could be any medium or a combination thereto from which the instructions can be transferred to a computer. This includes, but not limited to, RAMs, ROMs, floppies, CDs, and flash drives.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A method for detecting and blocking web attacks by enforcing combinations of read-only parameters using a list of names of bound parameters and a list of binding uniform resource locators (URLs), wherein the list of binding URLs includes only source URLs, wherein each source URL was in a prior URL request that generated a response with at least one parameter on the list of names of bound parameters, wherein the list of names of bound parameters includes only parameters that were previously deemed to be read-only parameters, the method comprising:

receiving a first URL request that is sent from a client to a server, wherein the first URL request is on the list of binding URLs;

receiving a first response that is in reply to the first URL request, wherein the first response includes a hyper-text markup language (HTML) element that comprises a plurality of parameters, a value for each of the plurality of parameters, and a target URL attribute;

computing a binding correlation value (BCV), which is a single correlation value that is computed over a combination of the plurality of parameter names and their values that are within the HTML element of the first response;

saving the BCV using the target URL attribute of the HTML element as an entry key for that BCV;

receiving a second URL request that includes the target URL attribute from the HTML element in the first response;

identifying, in the second URL request, all parameters with a name that is on the list of bound parameters;

computing, as a request BCV, a single correlation value over a combination of all of those parameters in the second URL request that were identified and their corresponding values in the second URL request;

comparing the request BCV to the BCV previously saved for the target URL attribute; and denying the second URL request if the request BCV does not match the BCV previously saved.

2. The method of claim 1, wherein at least one of the parameters on the list of names of bound parameters is selected from a group consisting of:

a hidden field in a form, a link with a query string, a checkbox, a radio button, and a combo box.

3. The method of claim 1, wherein each of the parameters on said list of names of bound parameters is a read-only parameter having an explicit value provided by an HTML element in a previous response.

4. The method of claim 1, wherein saving said BCV comprises:

creating a session dictionary entry in a session dictionary; and saving said BCV using the target URL attribute of the HTML element as an entry key for that BCV in said session dictionary.

5. The method of claim 1, wherein each of the parameters on the list of names of bound parameters are added to said list of names of bound parameters if a number of marked observations for each of those parameters is above a predefined threshold.

6. The method of claim 5, wherein said list of binding URLs comprises:

all URLs that yielded the bound parameters in said list of bound parameters.

7. A computer program product comprising a non-transitory computer-readable medium having instructions, the instructions being operable to enable a computer to perform a method for minimizing false-positive detection errors and improving efficiency in detecting and blocking web attacks, the method comprising:

generating a list of names of bound parameters and a list of binding URLs, wherein said generating comprises:

receiving, by a secure sensor, URL requests and responses being sent as part of sessions between a plurality of clients and a server;

for each of the sessions, performing the following:

for each parameter with a name and a corresponding value in the responses, performing the following:

computing, a set of one or more binding correlation values (BCVs), wherein each BCV is a correlation value computed over the corresponding value of the parameter within one of the responses; and saving the name of the parameter and a target URL associated with that parameter within one of the responses, with the set of BCVs computed for that parameter and one or more source URLs that generated one of the responses with that parameter;

for each parameter in each of the URL requests, performing the following:
computing a request BCV over a value of that parameter in the URL request, and
comparing the request BCV to one of the BCVs previously saved for that parameter and the respective target URL of the URL request; and
determining which of the parameters previously saved to classify as read-only parameters based on a total number of observations of matching comparisons of the request BCV to one of the BCVs previously saved for each of those parameters; and
based on the determining, respectively storing the name and source URLs for each of the parameters classified as read-only on the list of names of bound parameters and on the list of binding URLs; and
enforcing the list of names of bound parameters and the list of binding URLs in subsequent URL requests and responses on a per client basis.

8. The computer program product of claim 7, wherein at least one of said parameters that are classified as read-only is selected from a group consisting of hidden field in a form, a link with a query string, a checkbox, a radio button and a combo box.

9. The computer program product of claim 7, wherein the set of BCVs computed for each parameter and the source URLs that generated one of the responses with that parameter are saved in a session dictionary using the name of that parameter together with its corresponding target URL as an entry key.

10. The computer program product of claim 7, wherein the parameters previously saved are classified as read-only parameters based on whether a ratio of the total number of observations of matching comparisons to other observations of that parameter is above a threshold.

11. The computer program product of claim 7, wherein the parameters previously saved are classified as read-only parameters based on whether all observations for that parameter are matching comparisons over a predefined period of time.

12. The computer program product of claim 7, wherein the list of binding URLs and the list of names of bound parameters are accumulated over all sessions.

13. The computer program product of claim 7, wherein the step of enforcing the list of names of bound parameters and the list of binding URLs in subsequent URL requests and responses on a per client basis comprises:
computing a set of enforcement binding correlation values (BCVs) for the subsequent responses that are in reply to a binding URL on the list of binding URLs, wherein each one of the enforcement BCVs is a correlation value computed over a combination of names and values of all parameters with a name on the list of names of bound parameters that are within a HTML element in the corresponding subsequent response; and
denying those of the subsequent requests having a request BCV computed therefrom that does not match its respective enforcement BCV.

14. A non-intrusive network security system that is operable to implement a procedure for enforcing read-only parameters to detect and block web attacks, the security system comprising:
at least one secure sensor operable to process responses for identifying read-only parameters by parsing only those of the responses that are in reply to an uniform resource locator (URL) request on a list of binding URLs, wherein each of the read-only parameters has a name that is on a list of names of bound parameters;
a secure server operable to generate said list of names of bound parameters and said list of binding URLs, wherein said secure server is further operable to block web attacks by comparing request binding correlation values (BCVs) to their respective previously saved BCV wherein each of the request BCVs is a single correlation value computed over a combination of all read-only parameters and their corresponding values within a request that includes a target URL that was previously given by a response that the respective previously saved BCV was computed from; and
a plurality of connections operable to assist the plurality of secure sensors to monitor traffic directed to at least one device that requires protection.

15. The security system of claim 14, wherein said at least one secure sensor is configured to operate in a line of traffic between a client and the at least one device that requires protection.

16. The security system of claim 14, wherein each of said read-only parameters is at least one selected from a group consisting of a hidden field in a form, a link with a query string, a checkbox, a radio button, a combo box.

17. The security system of claim 14, wherein each of said read-only parameters has an explicit value given by an HTML element in a previous response.

18. A method for minimizing false-positive detection errors and improving efficiency in detecting and blocking web attacks, the method comprising:
generating a list of names of bound parameters and a list of binding URLs, wherein said generating comprises:
receiving, by a secure sensor, URL requests and responses being sent as part of sessions between a plurality of clients and a server;
for each of the sessions, performing the following:
for each parameter with a name and a corresponding value in the responses, performing the following:
computing a set of one or more binding correlation values (BCVs), wherein each BCV is a correlation value computed over the corresponding value of the parameter within one of the responses; and
saving the name of the parameter and a target URL associated with that parameter within one of the responses, with the set of BCVs computed for that parameter and one or more source URLs that generated one of the responses with that parameter;
for each parameter in each of the URL requests, performing the following:
computing a request BCV over a value of that parameter in the URL request, and
comparing the request BCV to one of the BCVs previously saved for that parameter and the respective target URL of the URL request; and
determining which of the parameters previously saved to classify as read-only parameters based on a total number of observations of matching comparisons of the request BCV to one of the BCVs previously saved for each of those parameters; and
based on the determining, respectively storing the name and source URLs for each of the parameters classified as read-only on the list of names of bound parameters and on the list of binding URLs; and enforcing the list of names of bound parameters and the list of binding URLs in subsequent URL requests and responses on a per client basis.

19. The method of claim 18, wherein at least one of said parameters that are classified as read-only is selected from a group consisting of hidden field in a form, a link with a query string, a checkbox, a radio button and a combo box.

20. The method of claim 18, wherein the set of BCVs computed for each parameter and the source URLs that generated one of the responses with that parameter are saved in a session dictionary using the name of that parameter together with its corresponding target URL as an entry key.

21. The method of claim 18, wherein the parameters previously saved are classified as read-only parameters based on whether a ratio of the total number of observations of matching comparisons to other observations of that parameter is above a threshold.

22. The method of claim 18, wherein the parameters previously saved are classified as read-only parameters based on whether all observations for that parameter are matching comparisons over a predefined period of time.

23. The method of claim 18, wherein the list of binding URLs and the list of names of bound parameters are accumulated over all sessions.

* * * * *